Feb. 9, 1960   T. J. CRAWFORD   2,924,099
THERMOSTAT
Filed Nov. 24, 1953
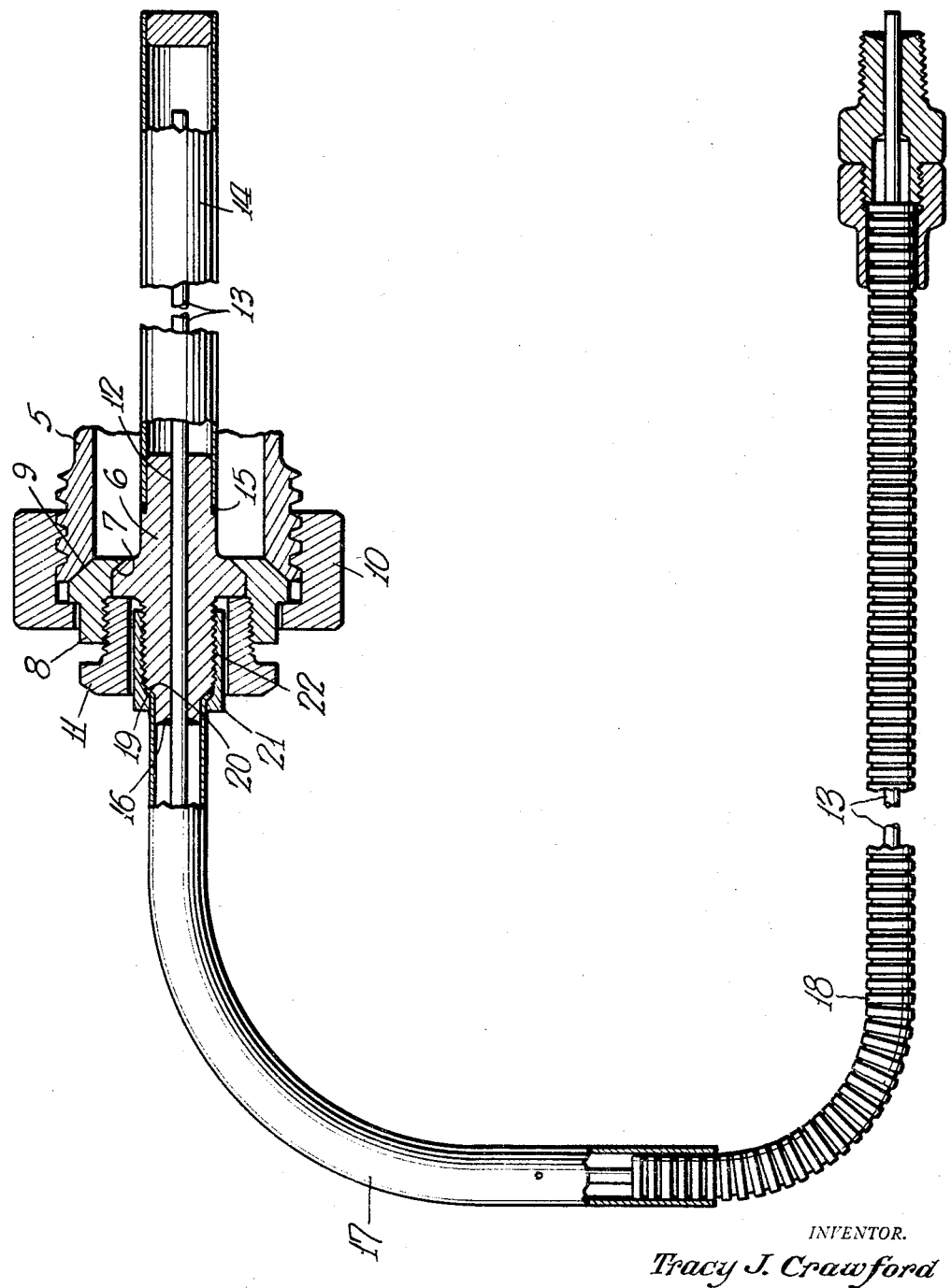
INVENTOR.
Tracy J. Crawford
ATTORNEYS United States Patent Office 2,924,099
Patented Feb. 9, 1960

2,924,099
THERMOSTAT
Tracy J. Crawford, Wallkill, N.Y.
Application November 24, 1953, Serial No. 394,010
1 Claim. (Cl. 73—368.4)

My invention relates to a thermostat and more particularly to a thermostat for use in the milk industry.

It is an object of the invention to provide a thermostat of the character indicated, having points of improvement rendering it easy to manufacture and assemble certain parts thereof.

It is another object to provide a thermostat of the character indicated, wherein certain parts are hermetically sealed to a coupling member and wherein a handle member is secured thereto without in anywise impairing the hermetic seal between other parts, and, in general, the object is to provide an improved form of thermostat of the character indicated.

In the drawing which shows, for illustrative purposes only, a preferred form of the invention, the figure illustrates a thermostat in partial section and assembled with a container for milk or the like.

In the form illustrated, the milk container or other device in which the thermostat is used may include an extension fitting 5 communicating with the main body of fluid in the container. The thermostat, in the preferred form shown, includes a coupling 6 having a generally conical ground surface 7 for engagement with a corresponding surface on a ferrule 8, which in turn has a generally conical ground surface 9 for engagement with the ground flared surface on the tubular extension 5 of the container. A union nut 10 serves to hold the ferrule 8 hermetically sealed to its seat, and a union nut 11 threaded into the ferrule 8 and engaging the flange on the thermostatic coupling member 6 serves to hold the latter hermetically sealed to the ferrule 8.

The thermostat itself may consist of the coupling 6 having a through bore 12 for receiving a capillary tube 13, which, in the form shown, extends completely through the bore in the coupling 6 and into a thermostatic bulb 14, which is telescopically received on the right-hand end of the coupling 6 and is hermetically sealed thereto as by soldering or other similar means 15. The capillary tube 13 is hermetically sealed in the coupling 6, as by means of a solder or similar joint 16 at the end opposite the thermostatic bulb 14. The capillary tube extends through a handle 17, and a flexible armored type cable 18 to recording mechanism (not shown).

The handle 17 is preferably formed of a piece of stainless steel tubing, which is secured to the armored casing 18 and secured to the coupling 6. In the form illustrated, one end of the bent handle tube 17 telescopically interfits with one end of the coupling 6, and as illustrated, the handle tube 17 fits over the end of the coupling and has a flared end 19 which fits a flared surface 20 at the inner end of the telescopically cylindrical part of the coupling. A coupling nut 21, threaded to the coupling at 22, engages the outside of the flared end 19 on the handle tube 17 and very rigidly and securely holds the handle tube to the coupling in permanent unit-handling relationship, so that the entire thermostatic member, including the coupling, may be handled and carried about by means of the handle 17. The coupling nut 21 is preferably round and is secured as by means of a strap wrench, thus providing a very compact construction, which will readily fit inside the union nut 11, which holds the coupling in place in the ferrule, as heretofore described.

It will be clear, then, that the handle tube 17 is very securely and conveniently held on the coupling 6, and if occasion demands can be removed therefrom without in anywise altering the thermostatic element proper and without unsealing the joint between the capillary tube 13 and the coupling 6. If the tube 17 were soldered or brazed to the coupling, there would be great danger of unsoldering the capillary tube 13 from the coupling during the soldering or brazing of the handle and coupling. If the coupling were soldered or brazed to the capillary tube at the opposite end of the coupling, there would be great danger of breaking that seal when the thermostatic bulb 14 is soldered or brazed to the coupling. Thus, it is possible to braze or solder the thermostatic bulb 14 to the coupling at one end and to solder or braze the capillary tube to the coupling at the other end without danger, and because of the mechanical connection of the handle, it is possible to connect the handle to the coupling and provide a unit-handling thermostat, all without danger of breaking the necessary hermetic seals of the thermostat.

While the invention has been described in considerable detail and a preferred form illustrated, it is to be understood that changes may be made within the scope of the invention as defined in the appended claim.

I claim:

A thermostat device for attachment to a container, the container having a threaded tubular extension, the end of said extension being flared outwardly from the inside surface thereof, an elongated coupling having a longitudinal bore therethrough for a capillary tube, said coupling having a flange intermediate the ends thereof, a peripheral edge on one side of said flange being conically shaped, said coupling being positioned within said tubular member so that said conically shaped edge is surrounded by the flared end of said extension, a cylindrically shaped ferrule having a pair of conically shaped surfaces on the outside and inside surfaces thereof abutting said flared end of said conically shaped flange end, said ferrule being threaded internally and including a ridge on the external surface thereof, a first union nut engaging said extension and abutting said ferrule ridge, a second union nut engaging said ferrule and abutting the opposite side of said flange whereby tightening said union nuts causes said flared conical surfaces to bear tightly against each other and form a hermetic seal, a thermostat bulb telescopically interfitting with one end of said coupling, a fused joint at said one end and hermetically sealing said telescopically interfitting parts, a capillary tube extending through said bore in said coupling and into said thermostat bulb, a fused joint between said capillary tube and the end of said coupling opposite said thermostat bulb end, a tapered end on said coupling surrounding said fused joint on said capillary tube, a handle comprising a curved pipe surrounding said capillary tube and serving to protect the same, said pipe having a flared end fitting over the tapered end of said coupling, and a coupling nut surrounding the flared end of said pipe and screwed onto said coupling to mechanically and detachably hold said pipe handle to said coupling.

References Cited in the file of this patent
UNITED STATES PATENTS

| | | |
|---|---|---|
| 920,883 | Ruff | May 4, 1909 |
| 926,194 | Junkers | June 29, 1909 |
| 1,313,333 | Roesch | Aug. 19, 1919 |
| 1,885,711 | Giesler | Nov. 1, 1932 |
| 1,890,006 | Swift | Dec. 6, 1932 |
| 1,985,733 | Koester | Dec. 25, 1934 |
| 2,273,631 | Edwards | Feb. 17, 1942 |
| 2,564,818 | Schwartz | Aug. 21, 1951 |
| 2,572,446 | Carson | Oct. 23, 1951 |
| 2,667,184 | Hailer | Jan. 26, 1954 |